United States Patent
Lai et al.

(10) Patent No.: US 10,042,108 B2
(45) Date of Patent: Aug. 7, 2018

(54) QUANTUM DOT ENHANCEMENT FILM, BACKLIGHT MODULE AND DISPLAY DEVICE

(71) Applicants: RADIANT OPTO-ELECTRONICS (SUZHOU) CO. LTD., Wujiang, Jiangsu (CN); RADIANT OPTO-ELECTRONICS CORPORATION, Kaohsiung (TW)

(72) Inventors: Chun-Hau Lai, Kaohsiung (TW); Wei-Hsuan Chen, Kaohsiung (TW)

(73) Assignees: RADIANT OPTO-ELECTRONICS (SUZHOU) CO., LTD., Wujiang (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 15/291,118

(22) Filed: Oct. 12, 2016

(65) Prior Publication Data

US 2017/0031086 A1   Feb. 2, 2017

Related U.S. Application Data

(63) Continuation of application No. PCT/CN2015/099784, filed on Dec. 30, 2015.

(30) Foreign Application Priority Data

Jun. 9, 2015   (CN) .......................... 2015 1 0313480

(51) Int. Cl.
*G02F 1/1335* (2006.01)
*F21V 8/00* (2006.01)

(52) U.S. Cl.
CPC .......... *G02B 6/0053* (2013.01); *G02B 6/0031* (2013.01); *G02B 6/0038* (2013.01); *G02B 6/0061* (2013.01); *G02B 6/0091* (2013.01)

(58) Field of Classification Search
CPC .... G02B 6/005; G02B 6/0053; G02B 6/0055; G02B 6/0088; G02B 6/0031;
(Continued)

(56) References Cited

U.S. PATENT DOCUMENTS 9,513,426 B2 *  12/2016  Hong ................... G02B 6/0053
2006/0056166 A1  3/2006  Yeo et al.
(Continued)

FOREIGN PATENT DOCUMENTS

CN   103228983 A    7/2013
CN   103698937 A    4/2014
(Continued)

OTHER PUBLICATIONS

PCT/CN2015/099784 International Search Report dated Mar. 24, 2016 (4 pages).
(Continued)

*Primary Examiner* — Thoi Duong
(74) *Attorney, Agent, or Firm* — Perkins Coie LLP (57) ABSTRACT

A backlight module includes a light source, a light guide plate, and a quantum dot enhancement film. The light guide plate has a light-incident side that faces toward the light source, a surrounding side that is connected to the light-incident side to constitute an outer periphery of the light guide plate, and a microstructure unit that is disposed adjacent to the surrounding side of the light guide plate. The quantum dot enhancement film is stacked on the light guide plate.

17 Claims, 9 Drawing Sheets

(58) Field of Classification Search
CPC ... G02B 6/0073; G02B 6/0038; G02F 1/1335;
G02F 1/133504; G02F 1/133553; G02F
1/133606; G02F 1/133609; G02F
1/133617; G02F 1/133615; G02F 1/1336;
G02F 1/133603; G02F 1/133605; G02F
2001/01791; G02F 2001/133624; G02F
2001/136222; G02F 2202/36; G02F
2202/108; F21K 9/61
USPC ...... 349/65, 62, 67, 113; 362/606, 608, 341,
362/609; 257/14
See application file for complete search history.

(56) References Cited

U.S. PATENT DOCUMENTS

| | | | |
|---|---|---|---|
| 2014/0311566 A1 | 10/2014 | Zhang et al. | |
| 2015/0355399 A1* | 12/2015 | You | G02B 6/005 349/65 |
| 2016/0097889 A1* | 4/2016 | Kim | G02B 6/005 362/607 |

FOREIGN PATENT DOCUMENTS

| | | |
|---|---|---|
| CN | 104061496 A | 9/2014 |
| CN | 104155803 A | 11/2014 |
| CN | 204807876 U | 11/2015 |
| TW | 201327926 A | 7/2013 |

OTHER PUBLICATIONS

TW104120585 Search Report from the Taiwan Intellectual Property Office dated Apr. 28, 2016 (2 pages).

* cited by examiner

QUANTUM DOT ENHANCEMENT FILM, BACKLIGHT MODULE AND DISPLAY DEVICE

CROSS-REFERENCE TO RELATED APPLICATION

This application is a bypass continuation of International Application No. PCT/CN2015/099784 filed on Dec. 30, 2015, which claims priority from Chinese Patent Application Serial No. 201510313480.1, filed on Jun. 9, 2015, the entire content of each of which is incorporated herein by reference.

FIELD

Embodiments of the present disclosure generally relate to a backlight module and a display device including the same, more particularly to a backlight module having a quantum dot enhancement film and a display device including the same.

BACKGROUND

A quantum dot enhancement film (QDEF) is an optical element currently used in backlight modules to enhance color display. Generally, a conventional quantum dot enhancement film may include two types of quantum dots dispersed in a thin film. When a light source irradiates light of a certain wavelength range, e.g., blue light, on the conventional quantum dot enhancement film, the two types of quantum dots may correspondingly emit red light and green light upon receiving the blue light, resulting in white light emission due to mixing of the same. An output ratio of the produced red and green lights to the incident blue light may be altered so that color adjustment of the mixed white light into a relatively natural light color is possible. By doing so, the color display on a display device utilizing the conventional quantum dot enhancement film can be relatively accurate.

Figure 1:
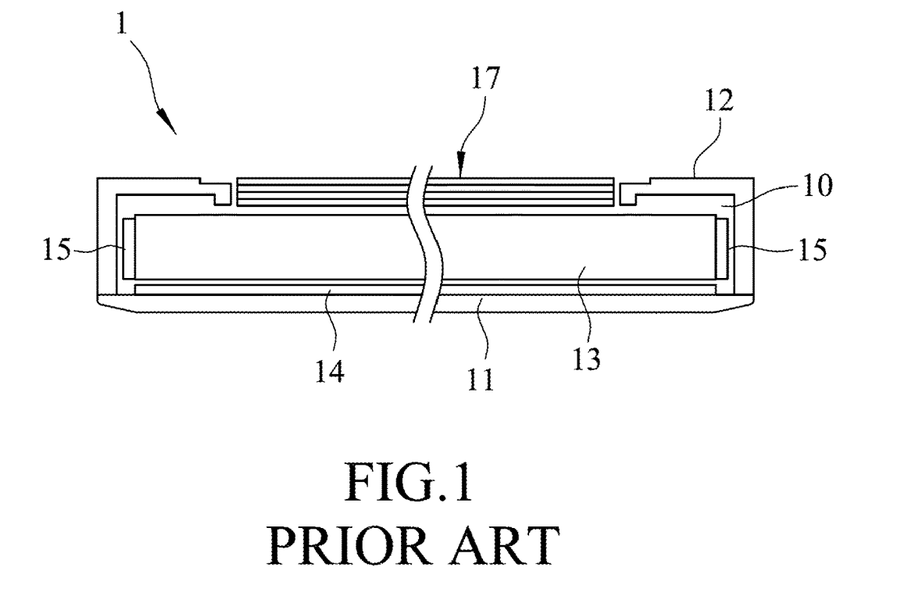
FIG. 1 is a schematic view illustrating a conventional display device.
Figure 2:
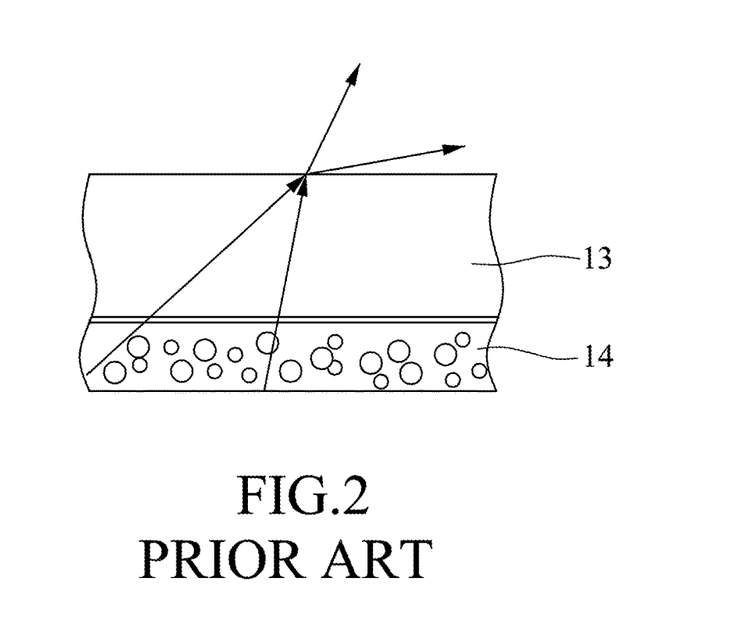
FIG. 2 is a fragmentary schematic view of the conventional display device.

Referring to FIGS. 1 and 2, a conventional display device includes a backlight module 1, a plurality of optical films 17 and a liquid crystal display panel (not shown). The backlight module 1 comprises a back plate 11, a side frame member 12 that is connected to the back plate 11 and that cooperates with the back plate 11 to define a receiving space 10, a light guide plate 13 that is disposed in the receiving space 10, a quantum dot enhancement film 14 that is disposed on a bottom surface of the light guide plate 13 and that is located in the receiving space 10, a light source (not shown) that is disposed in the receiving space 10 and adjacent to the light guide plate 13, and a reflector 15 that is disposed to surround the light guide plate 13. The optical films 17 are stacked on the light guide plate 13 opposite to the quantum dot enhancement film 14, and the liquid crystal display panel is provided thereupon. The light emitted from the light source of the backlight module 1 may be transmitted into and propagate within the light guide plate 13, where the optical films 17 can promote light reflection at a top surface of the light guide plate 13. Consequently, the total amount of light incident into the quantum dot enhancement film 14, as illustrated in FIG. 2, may be increased, generating a compensation light therefrom (such as red and green lights for the incident blue light). However, lateral portions of the quantum dot enhancement film 14 may have an insufficient amount of light incident from the light guide plate 13. Due to the lack of compensation light, the color of light emitted from lateral portions of the conventional display device may differ from that of the light emitted from central portions, resulting in an undesirable, so-called "blue edge" phenomenon to occur on the conventional display device.

SUMMARY

Certain embodiments of the present disclosure provide a quantum dot enhancement film that may be adapted for use in a backlight module including a light source and a light guide plate. Such a quantum dot enhancement film may include a base side, a surrounding side and a microstructure unit. The base side is adapted to be disposed adjacent to the light source. The surrounding side is connected to the base side and is adapted to be disposed corresponding to a surrounding side of the light guide plate. The microstructure unit is disposed adjacent to the surrounding side of the quantum dot enhancement film.

BRIEF DESCRIPTION OF THE DRAWINGS

Other features and advantages of the disclosure will become apparent in the following detailed description of the exemplary embodiments with reference to the accompanying drawings, of which.

DETAILED DESCRIPTION

It may be noted that like elements are denoted by the same reference numerals throughout the disclosure.

Figure 3:
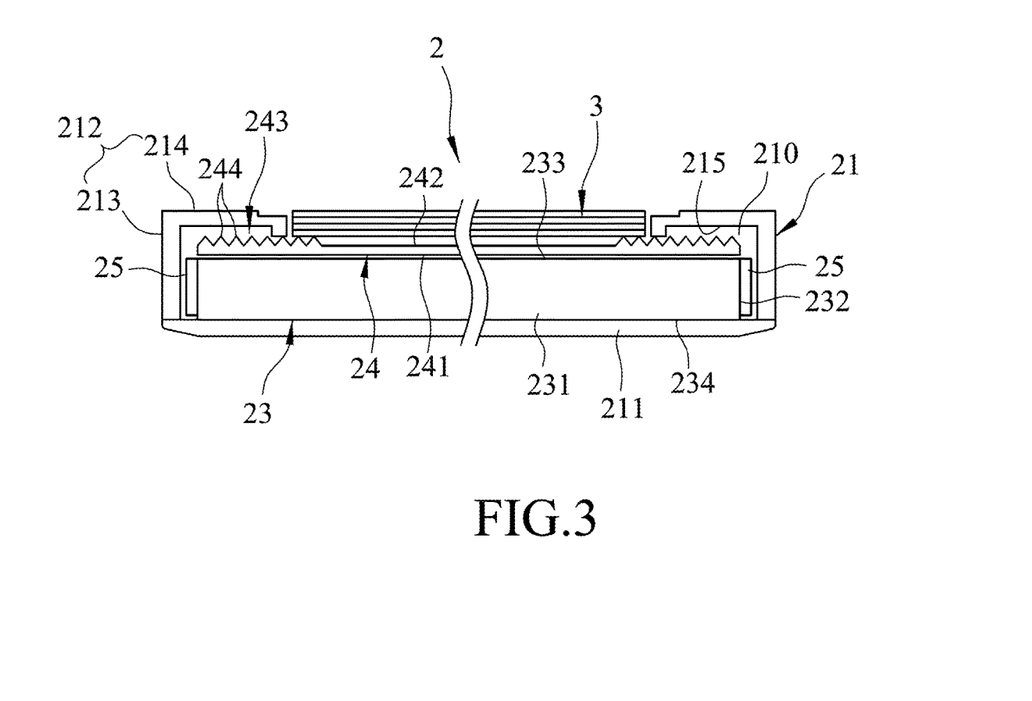
FIG. 3 is a schematic view illustrating one embodiment of a display device according to the present disclosure.
Figure 4:
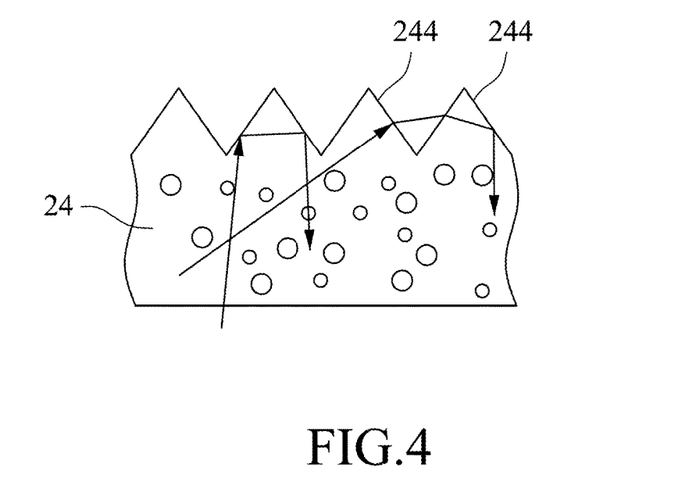
FIG. 4 is a fragmentary schematic view of one embodiment of a quantum dot enhancement film that may be embodied in FIG. 3.
Figure 6:
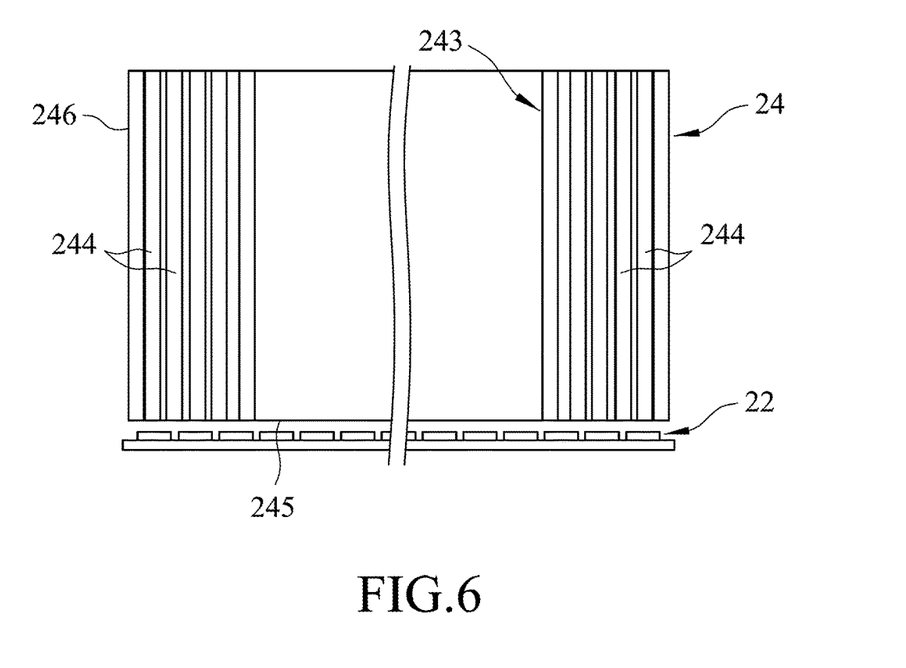
FIG. 6 is a schematic top view illustrating one embodiment of a quantum dot enhancement film that may be embodied in FIG. 3.

Referring to FIGS. 3, 4 and 6, a first exemplary embodiment of a backlight module 2 according to the present disclosure is shown to include a casing unit 21 defining a receiving space 210, a light source 22 disposed in the receiving space 210, a light guide plate 23 disposed in the receiving space 210, a quantum dot enhancement film 24 stacked on the light guide plate 23 and disposed in the receiving space 210, and a reflector 25 disposed in the receiving space 210 to surround the light guide plate 23 for reflecting back the light incident from the light guide plate 23.

As shown in FIG. 3, the casing unit 21 of this embodiment includes a back plate 211, and a side frame 212 cooperating with the back plate 211 to define the receiving space 210. The side frame 212 has an extending portion 213 that is connected to and extends from an outer periphery of the back plate 211, and a projecting portion 214 that is connected to a distal end of the extending portion 213 distal from the back plate 211, that projects inwardly from the distal end of the extending portion 213 and that has an inner reflective surface 215 facing toward the quantum dot enhancement film 24. In this embodiment, at least the projecting portion 214 of the side frame 212 is made of a light reflective material for reflecting light incident from the light guide plate 23.

In this embodiment, the light guide plate 23 has a light-incident side 231 that faces toward the light source 22 (see FIG. 6), a surrounding side 232 that is connected to the light-incident side 231 to constitute an outer periphery of the light-guide plate 23, and opposite top and bottom surfaces 233, 234.

Figure 5:
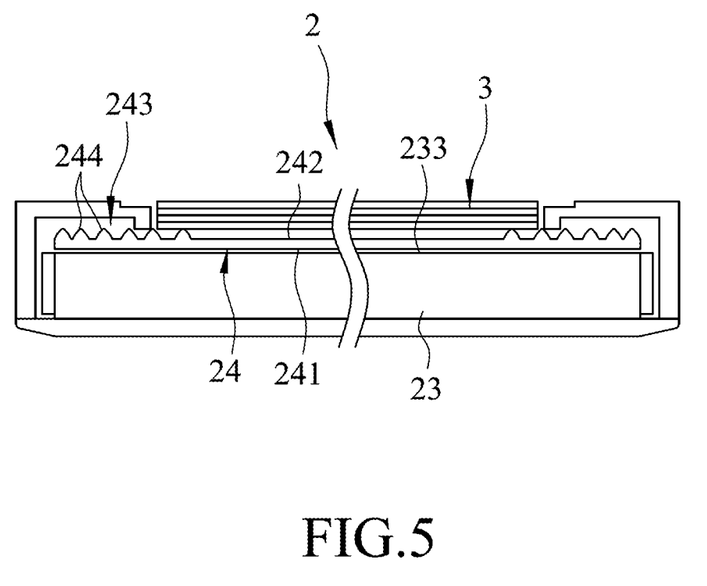
FIG. 5 is a schematic view illustrating another embodiment of the display device.
Figure 7:
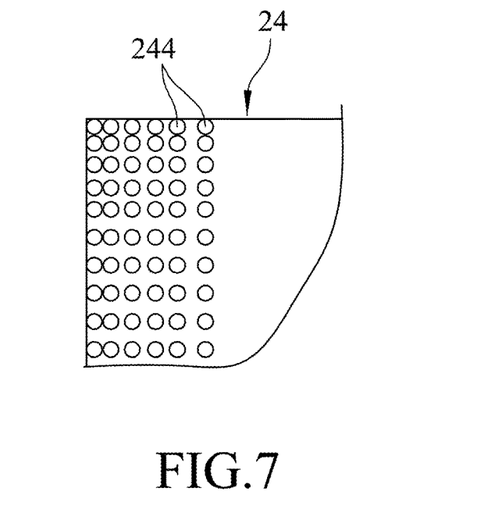
FIG. 7 is a schematic top view illustrating another embodiment of the quantum dot enhancement film that may be embodied in FIG. 3.

As shown in FIG. 3, the quantum dot enhancement film 24 of this embodiment is stacked on the top surface 233 of the light guide plate 23 and is disposed in the receiving space 210 of the casing unit 21. In this embodiment, with reference to FIGS. 3 and 6, the quantum dot enhancement film 24 includes a base side 245 that faces toward the light source 22 and that is disposed corresponding to the light-incident side 231 of the light guide plate 23, a surrounding side 246 that is connected to the base side 245 and that corresponds in position to the surrounding side 232 of the light guide plate 23, a light incident surface 241 that is disposed adjacent to the top surface 233 of the light guide plate 23, an optical surface 242 that is opposite to the light incident surface 241, and a microstructure unit 243 that is formed on the optical surface 242 and that is disposed adjacent to the surrounding side 246 of the quantum dot enhancement film 24, as well as to the surrounding side 232 of the light guide plate 23. The microstructure unit 243 may be arranged in a direction from the surrounding side 232 toward a center of the quantum dot enhancement film 24 so as to define a microstructure-free region surrounded by the microstructure unit 243. In this embodiment, the microstructure unit 243 includes a matte surface and has a plurality of first microstructures 244 which may be configured in various shapes, such as protrusions or indentations. For instance, the first microstructures 244 may be configured as elongated ridges defining elongated trenches therebetween (see FIG. 6), or as semi-spherical indentations as illustrated in FIG. 7. As shown in FIGS. 3 and 4, the first microstructures 244 of this embodiment may have a V-shaped cross section but are not limited thereto according to the present disclosure. For example, the first microstructures 244 may have an R-shaped cross section as illustrated in FIG. 5.

Figure 8:
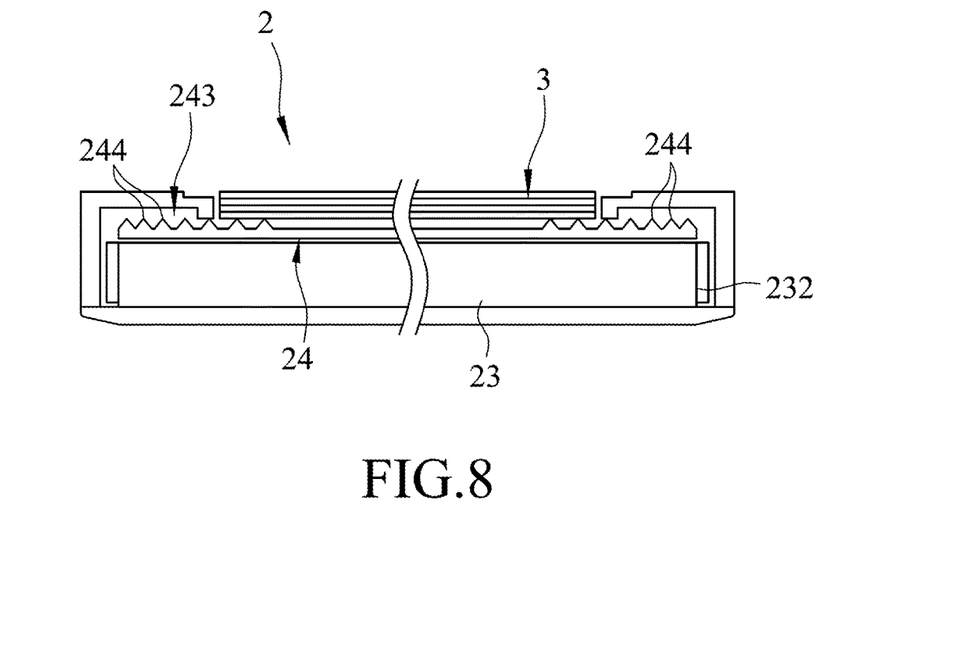
FIG. 8 is a schematic view illustrating yet another embodiment of the display device.
Figure 9:
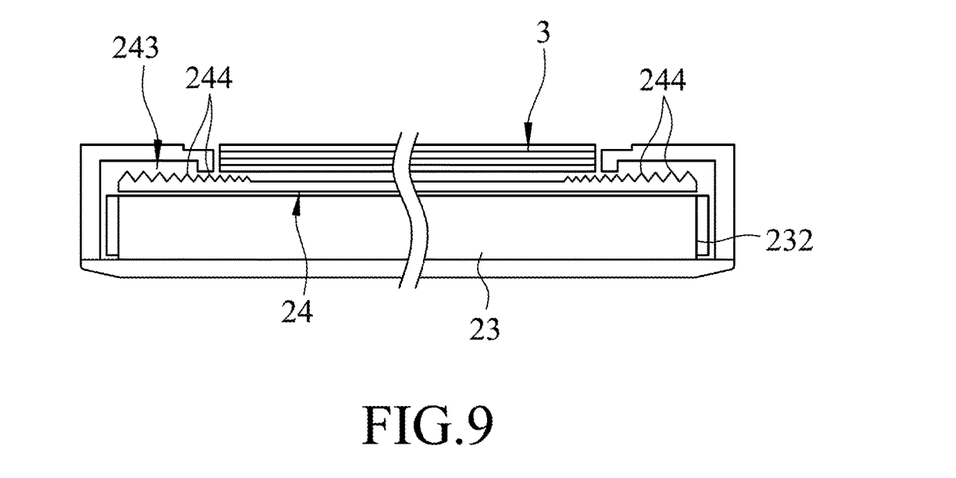
FIG. 9 is a schematic view illustrating yet another embodiment of the display device.
Figure 10:
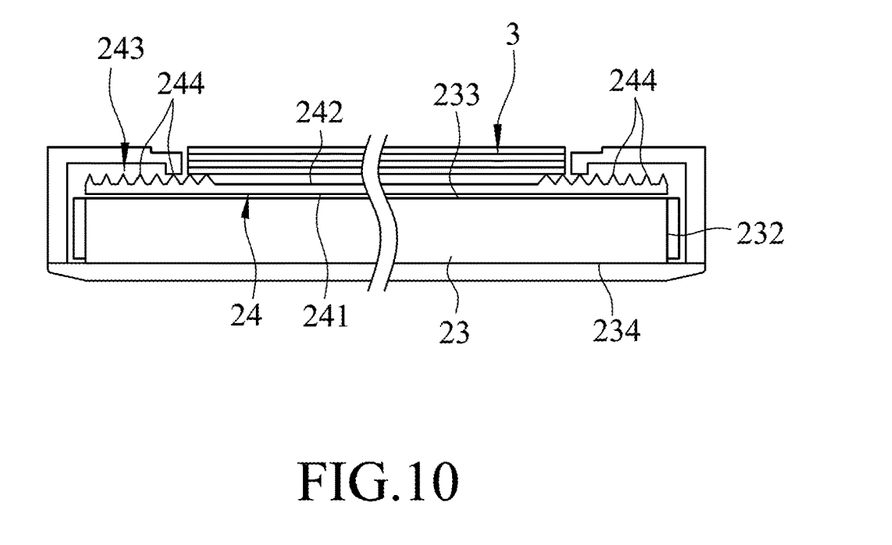
FIG. 10 is a schematic view illustrating yet another embodiment of the display device.

In certain embodiments, the first microstructures 244 may be configured as protrusions or indentations having various heights or depths, i.e., the microstructure unit 243 may be formed by roughening. As shown in FIG. 3, in this embodiment, a surface density of the first microstructures 244 may be uniform, and the depths, heights and height (or depth)-over-width ratios of the first microstructures 244 may be identical. In certain embodiments, the surface density of the first microstructures 244 may be negatively correlated with the distance to the surrounding side 232 of the light guide plate 23, as illustrated in FIG. 8. In certain embodiments, the first microstructures 244 may include a plurality of protrusions having heights that decrease as the distance to the surrounding side 232 of the light guide plate 23 increases, as illustrated in FIG. 9. In certain embodiments, the first microstructures 244 may include a plurality of indentations having depths that decrease as the distance to the surrounding side 232 of the light guide plate 23 increases, as illustrated in FIG. 9. In certain embodiments, the first microstructures 244 may include a plurality of protrusions (or indentations) having height-over-width (or depth-over-width) ratios that decrease as the distance to the surrounding side 232 of the light guide plate 23 increases, as illustrated in FIG. 10.

When the light incident from the light guide plate 23 enters the quantum dot enhancement film 24, there is a higher chance for the same to be reflected back by the microstructure unit 243 formed on the optical surface 242 and propagate through the quantum dot enhancement film 24 multiple times. Accordingly, quantum dots located adjacent to the surrounding side 246 of the quantum dot enhancement film 24 may have a higher chance of being excited by the incident light due to the increased number of times that the incident light passes through the quantum dot enhancement film 24. As such, sufficient compensation light can be produced by the quantum dots around the surrounding side 246, and thus the blue edge phenomenon can be prevented.

Figure 11:
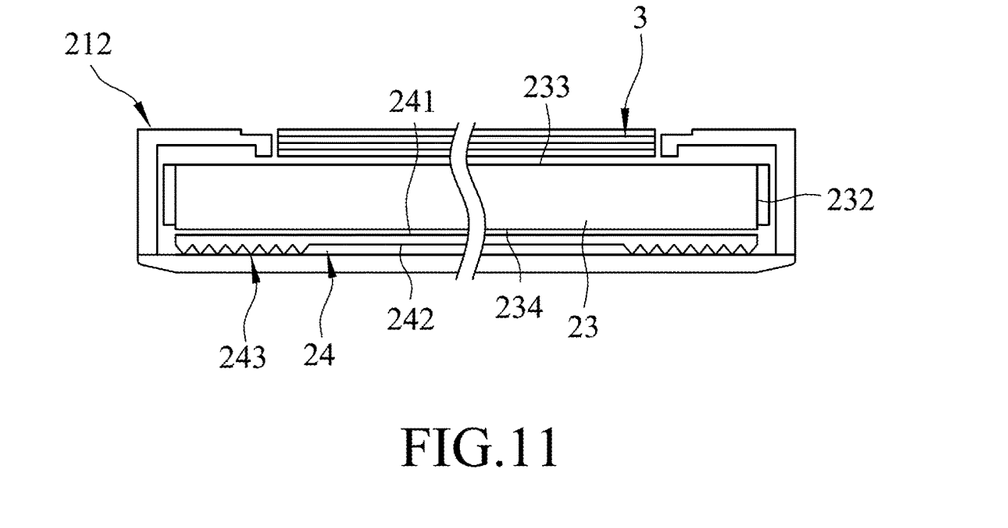
FIG. 11 is a schematic view illustrating yet another embodiment of the display device.
Figure 12:
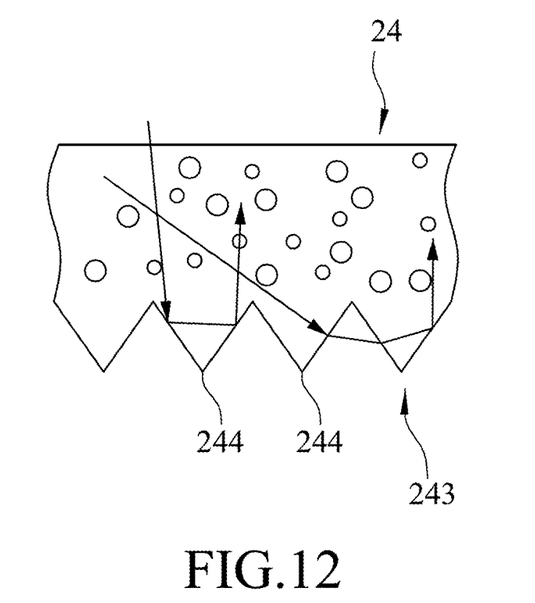
FIG. 12 is a fragmentary schematic view of one embodiment of the quantum dot enhancement film that may be embodied in FIG. 11.

Referring to FIGS. 11 and 12, a second exemplary embodiment of the backlight module 2 according to the present disclosure is shown to be similar to that of the first exemplary embodiment, with the difference residing in that the light incident surface 241 of the quantum dot enhancement film 24 faces toward the bottom surface 234 of the light guide plate 23. The backlight module 2 of the second exemplary embodiment has advantages similar to those of the first exemplary embodiment.

Figure 13:
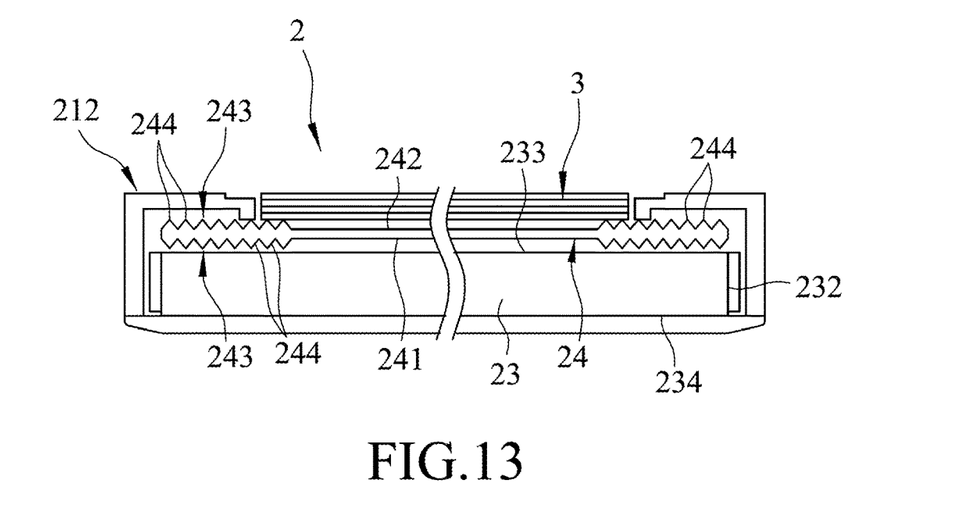
FIG. 13 is a schematic view illustrating yet another embodiment of the display device.

Referring to FIG. 13, a third exemplary embodiment of the backlight module 2 according to the present disclosure is shown to be similar to that of the first exemplary embodiment, with the only difference residing in that the microstructure unit 243 is formed on both the light incident surface 241 and the optical surface 242 of the quantum dot enhancement film 24. The backlight module 2 of the third exemplary embodiment has advantages similar to those of the first exemplary embodiment.

Figure 14:
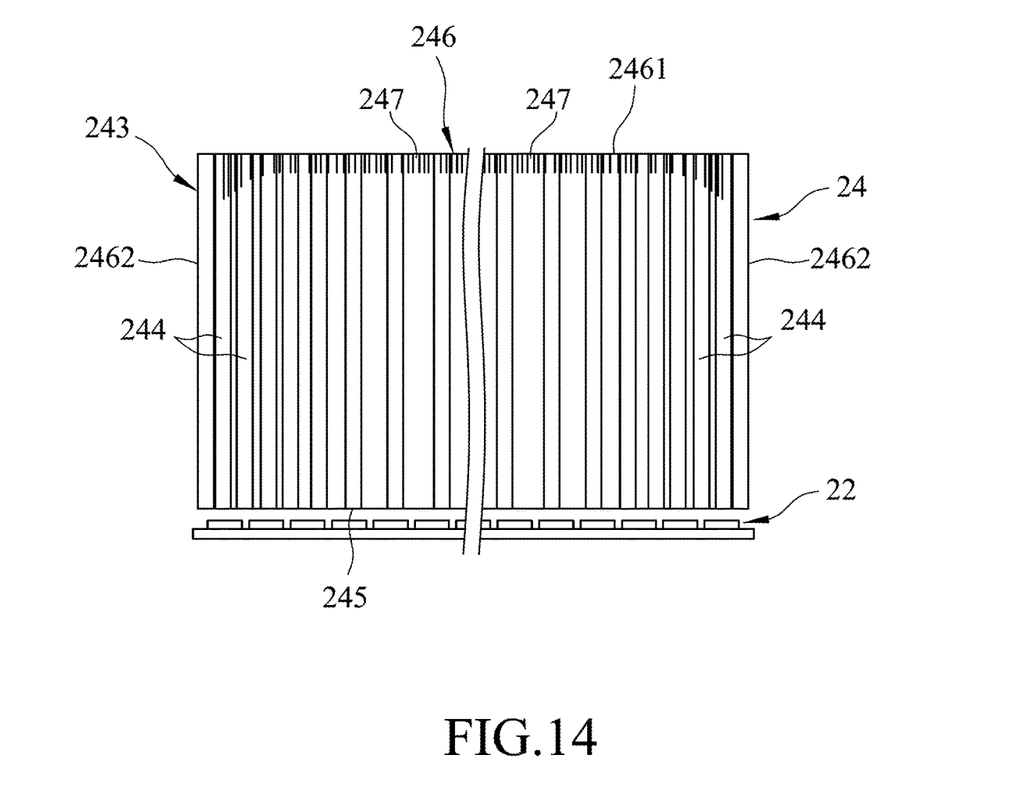
FIG. 14 is a top schematic view illustrating yet another embodiment of the display device.

Referring to FIG. 14, a fourth exemplary embodiment of the backlight module 2 according to the present disclosure is shown to be similar to that of the first exemplary embodiment. The differences between the first and fourth exemplary embodiments are as follows. The surrounding side 246 of the quantum dot enhancement film 24 has a central segment 2461 that is opposite to the base side 245, and a pair of lateral segments 2462 interconnecting the central segment 2461 and the base side 245. The microstructure unit 243 of the fourth exemplary embodiment may further include a plurality of second microstructures 247 disposed adjacent to the central segment 2461. As shown in FIG. 14, the second microstructures 247 include a plurality of grooves each extending along an axis normal to the base side 245 from the central segment 2461 of the surrounding side 246 toward the base side 245. The grooves of the second microstructures 247 have lengths that decrease as the distance to a nearest one of the lateral segments 2462 of the surrounding side 246 of the quantum dot enhancement film 24 increases. In this way, brightness of the backlight module 2 around the edges and the corners away from the light source 22 can be effectively enhanced, so as to prevent formation of dark bands thereat. It should be noted that the second microstructures 247 are not limited to the grooves. For example, the second microstructures 247 may include a plurality of projections extending from the central segment 2461 of the surrounding side 246 toward the base side 245 according to the present disclosure.

As illustrated in FIG. 3, one embodiment of a display device according to the present disclosure may comprise the backlight module 2, a plurality of optical films 3 stacked on the light guide plate 23, and a liquid crystal panel stacked on the optical films 3 (not shown in the figures). In certain embodiments, the optical films 3 may be stacked on the quantum dot enhancement film 24 opposite to the light guide plate 23. The liquid crystal panel may be stacked on the optical films 3 opposite to the quantum dot enhancement film 24. It should be noted that the backlight module 2 may be configured as described in other embodiments according to the present disclosure.

Figure 15:
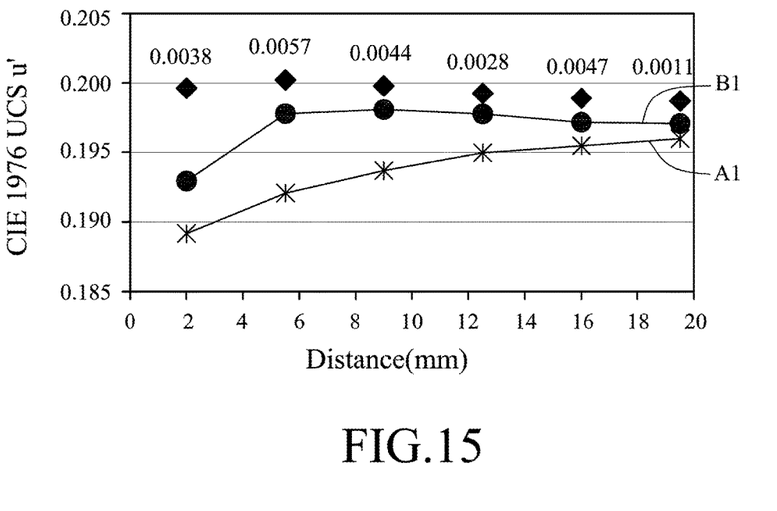
FIGS. 15 and 16 are graphs respectively illustrating chromaticity parameters of the conventional display device as shown in FIG. 1 and the display device as shown in FIG. 3, with respect to the distance to a lateral side of each display device.
Figure 16:
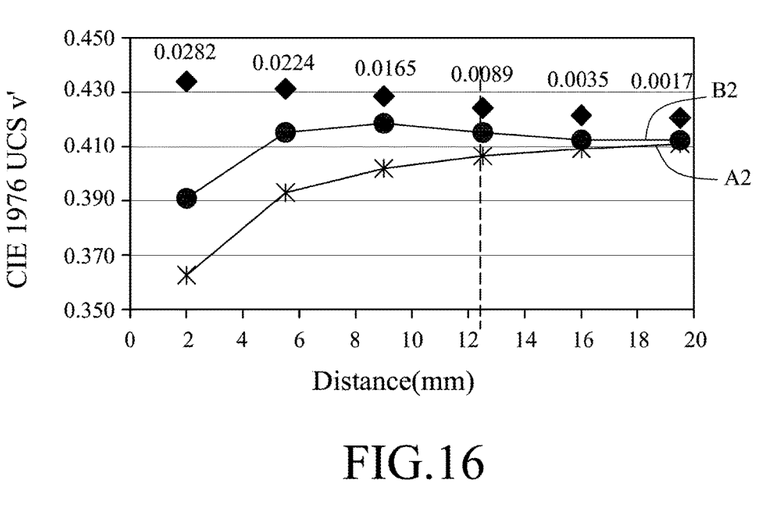

The display chromaticity of the conventional display device as illustrated in FIG. 1 and the display device as illustrated in FIG. 3 were examined. FIGS. 15 and 16 respectively illustrate the chromaticity parameters u' and v' in CIE 1976 UCS with respect to the distance from a lateral side of each display device (corresponding in position to one of the lateral segments 2462 of the surrounding side 246 of the quantum dot enhancement film 24), where a vertical dash line depicted in FIG. 16 represents a boundary of an extended region of the quantum dot enhancement film 24 on which the microstructure unit 243 is formed. The data obtained from the conventional display device are plotted as Lines A1 (in FIG. 15) and A2 (in FIG. 16), the data obtained from the display device of the present disclosure as illustrated in FIG. 3 are plotted as Lines B1 (in FIG. 15) and B2 (in FIG. 16), and the difference between the data from the conventional display device and the display device of the present disclosure are represented by diamond points in both figures. The plotted Lines A1 and A2 clearly and respectively illustrate that the chromaticity parameters u' and v' start to drop from a relatively long distance to the lateral side (~12 mm), which means the blue edge phenomenon is significant in the conventional display device. In comparison, the plotted Lines B1 and B2 respectively illustrate that the parameters u' and v' do not start to drop until at a relatively close distance to the lateral side of the display device (4~6 mm), which means the blue edge phenomenon is effectively reduced in the display device of the present disclosure.

To sum up, by virtue of forming the microstructure unit 243 at the quantum dot enhancement film 24 that is stacked on the light guide plate 23 and adjacent to the surrounding side 232 of the light guide plate 23, the light emitted from the light source 22 or reflected by the reflector 25 can pass through the quantum dot enhancement film 24 multiple times, so that the quantum dots located adjacent to the surrounding side 241 of the quantum dot enhancement film 24 may have a higher chance of being excited by the incident light due to the increased number of times that the incident light passes through the quantum dot enhancement film 24. As such, sufficient compensation light can be produced by the quantum dots around the surrounding side 246 of the quantum dot enhancement film 24, and the aforementioned drawbacks of the prior art can be prevented.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A quantum dot enhancement film adapted for use in a backlight module including a light source and a light guide plate, said quantum dot enhancement film comprising:
   a film body that is dispersed with a plurality of quantum dots within;
   a base side that is adapted to be disposed adjacent to the light source; a surrounding side that is connected to said base side and that is adapted to be disposed corresponding to a surrounding side of the light guide plate; and
   a microstructure unit that is disposed adjacent to said surrounding side of said quantum dot enhancement film;
   wherein said surrounding side of said quantum dot enhancement film has a central segment that is opposite to said base side, and a pair of lateral segments interconnecting said central segment and said base side;
   wherein said microstructure unit includes a plurality of first microstructures adjacent to said lateral segments;
   wherein said microstructure unit further includes a plurality of second microstructures adjacent to said central segment;
   wherein said second microstructures are extended along an axis normal to said base side and have lengths that decrease as a distance to a nearest one of said lateral segments of said surrounding side of said quantum dot enhancement film increases.

2. The quantum dot enhancement film according to claim 1, wherein said microstructure unit is arranged in a direction from said surrounding side of said quantum dot enhancement film toward a center of said quantum dot enhancement film, so as to define a microstructure-free region surrounded by said microstructure unit.

3. The quantum dot enhancement film according to claim 1, wherein said first microstructures have a surface density that is negatively correlated with the distance to said surrounding side of said quantum dot enhancement film.

4. The quantum dot enhancement film according to claim 1, wherein said first microstructures include a plurality of indentations having depths that decrease as a distance to said surrounding side of said quantum dot enhancement film increases.

5. The quantum dot enhancement film according to claim 1, wherein said first microstructures include a plurality of protrusions having heights that decrease as a distance to said surrounding side of said quantum dot enhancement film increases.

6. The quantum dot enhancement film according to claim 1, wherein said first microstructures include a plurality of protrusions having height-over-width ratios that decrease as a distance to said surrounding side of said quantum dot enhancement film increases.

7. The quantum dot enhancement film according to claim 1, wherein said first microstructures include a plurality of indentations having depth-over-width ratios that decrease as a distance to said surrounding side of said quantum dot enhancement film increases.

8. The quantum dot enhancement film according to claim 1, wherein said second microstructures are arranged from said central segment of said surrounding side toward said base side.

9. The quantum dot enhancement film according to claim 1, further comprising a light incident surface and an optical surface that is opposite to said light incident surface, said microstructure unit being formed on at least one of said light incident surface or said optical surface.

10. The quantum dot enhancement film according to claim 1, wherein said first microstructure unit includes a plurality of first microstructures having a V-shaped cross-section and having height-over-width ratios that decrease as a distance to said surrounding side of said quantum dot enhancement film increases.

11. The quantum dot enhancement film according to claim 1, further comprising a central portion, and a lateral portion that surrounds said central portion, and that has said base side and said surrounding side, said microstructure unit being formed only on said lateral portion without being formed on said central portion.

12. The quantum dot enhancement film according to claim 1, wherein said microstructure unit includes a matte surface.

13. The quantum dot enhancement film according to claim 1, wherein said microstructure unit is disposed to be covered by said light guide plate.

14. A backlight module, comprising:
a casing unit defining a receiving space; a light source disposed in said receiving space;
a light guide plate disposed in said receiving space and having a light-incident side that faces toward said light source, and a surrounding side that is connected to said light-incident side to constitute an outer periphery of said light-guide plate; and said quantum dot enhancement film of claim 1.

15. The backlight module according to claim 14, wherein:
said casing unit includes a back plate, and a side frame cooperating with the back plate to define the receiving space; and
said side frame has an extending portion that is connected to and extends from an outer periphery of said back plate, and a projecting portion that is connected to said extending portion, that is projected inwardly to the receiving space, and that has an inner reflective surface.

16. The backlight module according to claim 15, wherein at least said projecting portion of said side frame is made of a light reflective material.

17. A display device comprising:
said backlight module of claim 14;
a plurality of optical films that are stacked on said light guide plate; and a liquid crystal panel that is stacked on said optical films opposite to said light guide plate.

* * * * *